US012699993B2

(12) United States Patent
    Ravinathan

(10) Patent No.: US 12,699,993 B2
(45) Date of Patent: Aug. 4, 2026

(54) METHODS AND SYSTEMS FOR GENERATING AND VALIDATING TRANSACTIONS ON A DISTRIBUTED LEDGER

(71) Applicant: MASTERCARD ASIA/PACIFIC PTE. LTD., Singapore (SG)

(72) Inventor: Srinath Ravinathan, Singapore (SG)

(73) Assignee: MASTERCARD ASIA/PACIFIC PTE. LTD, Singapore (SG)

( * ) Notice: Subject to any disclaimer, the term of this patent is extended or adjusted under 35 U.S.C. 154(b) by 309 days.

(21) Appl. No.: 17/960,954

(22) Filed: Oct. 6, 2022

(65) Prior Publication Data

US 2023/0130347 A1    Apr. 27, 2023

(30) Foreign Application Priority Data

Oct. 26, 2021    (SG) ............................ 10202111886Y

(51) Int. Cl.
    *G06Q 20/38*       (2012.01)
    *G06Q 20/40*       (2012.01)
    *G06Q 20/36*       (2012.01)

(52) U.S. Cl.
    CPC ...  *G06Q 20/3827* (2013.01); *G06Q 20/38215* (2013.01); *G06Q 20/3829* (2013.01);
                    (Continued)

(58) Field of Classification Search
    None
    See application file for complete search history.

(56) References Cited

U.S. PATENT DOCUMENTS 10,540,654 B1 *   1/2020   James .................. G06Q 20/223
10,824,763 B2 *   11/2020   Yu ......................... H04L 9/3242
                    (Continued)

FOREIGN PATENT DOCUMENTS

CA          3013180 A1 *   8/2017   .............. H04L 9/50
CN          107862607 A  *   3/2018
                    (Continued)

OTHER PUBLICATIONS

A. A. Monrat, O. Schelén and K. Andersson, "A Survey of Blockchain From the Perspectives of Applications, Challenges, and Opportunities," in IEEE Access, vol. 7, pp. 117134-117151, 2019. https://ieeexplore.ieee.org/document/8805074?source=IQplus (Year: 2019).*
                    (Continued)

*Primary Examiner* — El Mehdi Oussir
(74) *Attorney, Agent, or Firm* — Panitch Schwarze Belisario & Nadel LLP

(57) ABSTRACT

Disclosed is a method of releasing a locked transaction encoded in a smart contract on a distributed ledger network. The locked transaction is locked by at least one hash lock condition requiring matching to a hash. The method involves: receiving entry of a passcode associated with the locked transaction: transmitting a request to generate a first hash to a contactless payment device and receiving the first hash from that device; generating a second hash based on the first hash and transaction-specific data; and transmitting an unlock request comprising the second hash and an address of the smart contract on the distributed ledger network, to a node of that network. The unlock request causes the smart contract to release the locked transaction on matching of the second hash against the hash of the hash lock condition.

11 Claims, 6 Drawing Sheets

400

(52) U.S. Cl.
CPC ....... G06Q 20/401 (2013.01); *G06Q 20/3674* (2013.01); *G06Q 2220/00* (2013.01)

(56) References Cited

U.S. PATENT DOCUMENTS

| | | | | |
|---|---|---|---|---|
| 11,139,955 | B1 * | 10/2021 | So | G06Q 20/3674 |
| 11,200,569 | B1 * | 12/2021 | James | G06Q 20/381 |
| 11,308,487 | B1 * | 4/2022 | Foster | G06Q 20/3829 |
| 11,334,883 | B1 * | 5/2022 | Auerbach | G06Q 20/223 |
| 11,354,278 | B2 * | 6/2022 | Sen | G06Q 20/3829 |
| 11,475,442 | B1 * | 10/2022 | James | G06Q 20/3829 |
| 11,501,370 | B1 * | 11/2022 | Paya | G06Q 20/3676 |
| 11,522,700 | B1 * | 12/2022 | Auerbach | H04L 9/3213 |
| 11,909,860 | B1 * | 2/2024 | So | G06Q 40/06 |
| 2016/0162883 | A1 * | 6/2016 | Liscia | G06Q 20/363 |
| | | | | 705/71 |
| 2016/0307186 | A1 * | 10/2016 | Noë | G06Q 20/3278 |
| 2017/0046689 | A1 * | 2/2017 | Lohe | G06F 12/1408 |
| 2017/0083907 | A1 * | 3/2017 | McDonough | G06Q 20/3825 |
| 2017/0085555 | A1 * | 3/2017 | Bisikalo | G06Q 20/10 |
| 2017/0091756 | A1 * | 3/2017 | Stern | G06Q 20/36 |
| 2017/0109735 | A1 * | 4/2017 | Sheng | G06Q 20/3678 |
| 2017/0132621 | A1 * | 5/2017 | Miller | H04L 9/0861 |
| 2017/0148016 | A1 * | 5/2017 | Davis | G06Q 20/3827 |
| 2017/0323294 | A1 * | 11/2017 | Rohlfing | H04L 9/3239 |
| 2018/0096348 | A1 | 4/2018 | Leite Netto et al. | |
| 2018/0191503 | A1 * | 7/2018 | Alwar | G06Q 20/065 |
| 2018/0218176 | A1 * | 8/2018 | Voorhees | G06Q 20/02 |
| 2018/0276657 | A1 * | 9/2018 | Cho | G06Q 20/3223 |
| 2018/0285996 | A1 * | 10/2018 | Ma | H04L 9/0637 |
| 2019/0005469 | A1 * | 1/2019 | Dhupkar | H04L 9/3236 |
| 2019/0013943 | A1 * | 1/2019 | Maim | H04L 9/30 |
| 2019/0018888 | A1 * | 1/2019 | Madisetti | G06F 16/27 |
| 2019/0043048 | A1 * | 2/2019 | Wright | H04L 9/0861 |
| 2019/0052467 | A1 * | 2/2019 | Bettger | H04L 9/0643 |
| 2019/0087816 | A1 * | 3/2019 | Jamkhedkar | G06Q 20/3674 |
| 2019/0149337 | A1 * | 5/2019 | Savanah | H04L 9/3066 |
| | | | | 713/168 |
| 2019/0236598 | A1 * | 8/2019 | Padmanabhan | G06Q 20/389 |
| 2019/0318353 | A1 | 10/2019 | Castinado et al. | |
| 2019/0362339 | A1 * | 11/2019 | Gurunathan | G06Q 20/3674 |
| 2020/0058023 | A1 * | 2/2020 | Travizano | H04L 9/3239 |
| 2020/0167767 | A1 | 5/2020 | Wouters et al. | |
| 2020/0193429 | A1 * | 6/2020 | Babar | H04L 9/3239 |
| 2020/0202350 | A1 * | 6/2020 | Chan | G06Q 20/02 |
| 2020/0250666 | A1 * | 8/2020 | Carri | G06Q 20/4014 |
| 2020/0302441 | A1 | 9/2020 | Collinge et al. | |
| 2020/0320564 | A1 * | 10/2020 | Ramesh | G06Q 20/367 |
| 2020/0380154 | A1 * | 12/2020 | Jayachandran | H04L 9/3239 |
| 2020/0387893 | A1 * | 12/2020 | Maim | G09C 1/00 |
| 2020/0396065 | A1 * | 12/2020 | Gutierrez-Sheris | H04L 9/3297 |
| 2021/0004792 | A1 * | 1/2021 | Kikinis | G06Q 20/3827 |
| 2021/0058231 | A1 * | 2/2021 | Nogayama | G06Q 20/3827 |
| 2021/0073913 | A1 * | 3/2021 | Ingargiola | G06F 21/64 |
| 2021/0117381 | A1 * | 4/2021 | Irazabal | G06F 16/1834 |
| 2021/0135847 | A1 * | 5/2021 | Manevich | G06F 16/9014 |
| 2021/0232571 | A1 * | 7/2021 | Singh Dilip Thakur | G06F 21/57 |
| 2021/0264520 | A1 * | 8/2021 | Cummings | G06Q 40/06 |
| 2021/0312020 | A1 * | 10/2021 | Lindeman | H04L 9/3273 |
| 2021/0398116 | A1 * | 12/2021 | Fang | G06Q 20/38215 |
| 2022/0027803 | A1 * | 1/2022 | Irazabal | G06Q 10/0832 |
| 2022/0051235 | A1 | 2/2022 | Ohashi et al. | |
| 2022/0069994 | A1 * | 3/2022 | Maim | H04L 9/0866 |
| 2023/0123311 | A1 * | 4/2023 | Spence | G06Q 20/36 |
| | | | | 705/76 |
| 2024/0095728 | A1 * | 3/2024 | Agrawal | G06Q 20/3827 |
| 2024/0235843 | A1 * | 7/2024 | Davies | H04L 9/50 |
| 2024/0261692 | A1 * | 8/2024 | Sliwka | H04L 9/3213 |
| 2024/0346087 | A1 * | 10/2024 | Quigley | G06F 16/22 |
| 2024/0370865 | A1 * | 11/2024 | Bernardi | G06Q 20/36 |

FOREIGN PATENT DOCUMENTS

| | | | | | |
|---|---|---|---|---|---|
| CN | 108027867 | A * | 5/2018 | | G06F 12/1408 |
| CN | 3577853 | A2 * | 12/2018 | | |
| CN | 110827034 | A * | 2/2020 | | G06Q 20/405 |
| CN | 110993044 | A * | 4/2020 | | G06F 21/6245 |
| CN | 111080292 | A * | 4/2020 | | G06Q 20/3825 |
| CN | 111161062 | A * | 5/2020 | | G06Q 40/04 |
| CN | 111181715 | A * | 5/2020 | | H04L 9/0643 |
| CN | 111183445 | A * | 5/2020 | | G06F 16/1774 |
| CN | 111324446 | A * | 6/2020 | | G06F 16/27 |
| CN | 111402055 | A * | 7/2020 | | G06F 21/602 |
| CN | 111480162 | A * | 7/2020 | | G06Q 20/405 |
| CN | 111640017 | A * | 9/2020 | | G06F 16/2322 |
| CN | 111652618 | A * | 9/2020 | | G06Q 20/3825 |
| CN | 111784518 | A * | 10/2020 | | G06Q 40/04 |
| CN | 111985003 | A * | 11/2020 | | H04L 9/50 |
| CN | 112068948 | A * | 12/2020 | | G06F 9/5022 |
| CN | 108765240 | B * | 8/2022 | | H04L 9/3247 |
| CN | 109863719 | B * | 8/2022 | | G06F 21/645 |
| CN | 114982193 | A * | 8/2022 | | G06F 21/645 |
| CN | 115136543 | A * | 9/2022 | | G06Q 20/065 |
| CN | 115136560 | A * | 9/2022 | | H04L 45/04 |
| CN | 116739778 | A * | 9/2023 | | G06F 16/1834 |
| CN | 117611331 | A * | 2/2024 | | G06F 16/137 |
| DE | 102020100787 | A1 * | 7/2020 | | G05B 19/4155 |
| EP | 3403213 | B1 * | 10/2024 | | G06F 21/44 |
| GB | 2608179 | A * | 12/2022 | | G06F 21/64 |
| JP | 2022055352 | A * | 4/2022 | | G06Q 40/12 |
| JP | 2022541323 | A * | 9/2022 | | |
| JP | 7604467 | B2 * | 12/2024 | | G06Q 20/401 |
| KR | 20200010289 | A * | 5/2018 | | |
| KR | 20200080265 | A * | 10/2018 | | |
| KR | 102099861 | B1 * | 4/2020 | | G06F 21/6209 |
| KR | 20220012344 | A * | 2/2022 | | H04L 9/50 |
| KR | 20220012347 | A * | 2/2022 | | |
| KR | 20220044306 | A * | 4/2022 | | |
| KR | 20220149556 | A * | 11/2022 | | |
| KR | 20230062835 | A * | 5/2023 | | |
| WO | WO-2018070848 | A1 * | 4/2018 | | G06F 21/31 |
| WO | WO-2018175701 | A1 * | 9/2018 | | G06Q 20/227 |
| WO | 2018192931 | A1 | 10/2018 | | |
| WO | WO-2019092544 | A1 * | 5/2019 | | H04L 63/12 |
| WO | WO-2019109003 | A1 * | 6/2019 | | G06Q 20/3678 |
| WO | WO-2019116248 | A1 * | 6/2019 | | G06F 16/2246 |
| WO | WO-2019217936 | A1 * | 11/2019 | | G06Q 20/2295 |
| WO | 2020059865 | A1 | 3/2020 | | |
| WO | WO-2020051710 | A1 * | 3/2020 | | |
| WO | WO-2021014233 | A1 * | 1/2021 | | H04L 9/50 |
| WO | WO-2021046494 | A1 * | 3/2021 | | G06F 16/2358 |
| WO | WO-2021184962 | A1 * | 9/2021 | | H04L 9/3247 |
| WO | WO-2022076800 | A1 * | 4/2022 | | G06Q 20/3674 |

OTHER PUBLICATIONS

Hosp et al., "COMIT—Cryptographically-secure Off-chain Multi-asset Instant Transaction Network," Cornell University, 2018. https://ieeexplore.ieee.org/document/8805074?source=IQplus (Year: 2018).*

D. W. Kravitz, "Transaction Immutability and Reputation Trace-ability: Blockchain as a Platform for Access Controlled IoT and Human Interactivity," 2017 15th Annual Conference on Privacy, Security and Trust (PST), Calgary, AB, Canada, 2017. https://ieeexplore.ieee.org/document/8476873?source=IQplus (Year: 2017).*

K. Christidis and M. Devetsikiotis, "Blockchains and Smart Con-tracts for the Internet of Things, " in IEEE Access, vol. 4, pp. 2292-2303, 2016, https://ieeexplore.ieee.org/document/7467408?source=IQplus. (Year: 2016).*

V. Y. Kemmoe, W. Stone, J. Kim, D. Kim and J. Son, "Recent Advances in Smart Contracts: A Technical Overview and State of the Art," in IEEE Access, vol. 8, https://ieeexplore.ieee.org/document/9125932?source=IQplus (Year: 2020).*

International Search Report and Written Opinion dated May 25, 2023, corresponding to PCT/SG2022/050759 (9 pages).

* cited by examiner

METHODS AND SYSTEMS FOR GENERATING AND VALIDATING TRANSACTIONS ON A DISTRIBUTED LEDGER

TECHNICAL FIELD

The present disclosure relates to methods and systems for validating distributed ledger transactions, for example for confirming payment upon delivery of goods.

BACKGROUND

Cash on delivery, also known as collect on delivery (COD), is a commonly practised mode of transaction, in which payment to a vendor is made only once a good is delivered or a service is consumed. Where payment is to be made by credit card or debit card, this may be done in a conventional card payment ecosystem in two phases, termed Authorization and Capture. Authorization sets aside funds from the bank account that is linked to the card, and Capture completes the payment transaction (i.e., effects actual transfer of funds from consumer to merchant).

This two phase process enables use cases like COD, because it engenders trust for both the merchant and the consumer. The merchant can be sure that when a consumer authorizes the payment, it is held aside under a pseudo-escrow mechanism in the card payment system. The consumer can be sure that funds will be transferred only on delivery or consumption of the goods or services.

More recently, electronic transactions made using cryptocurrencies based on public or private distributed ledgers have become increasingly popular. In a distributed ledger ecosystem there is presently no way that a COD-type mechanism can be implemented. It would be desirable to provide such a mechanism for distributed ledger-based transactions.

SUMMARY

Disclosed is a method of releasing a locked transaction encoded in a smart contract on a distributed ledger network, the locked transaction being locked by at least one hash lock condition that requires matching to a hash, the method being carried out at a terminal and comprising:

receiving entry of a passcode associated with the locked transaction;

transmitting, to a contactless payment device, a request to generate a first hash;

receiving, from the contactless payment device, the first hash;

generating a second hash based on the first hash and transaction-specific data associated with the locked transaction; and transmitting an unlock request to a node of the distributed ledger network, the unlock request comprising the second hash and an address of the smart contract on the distributed ledger network;

wherein the unlock request causes the smart contract to release the locked transaction on matching of the second hash against the hash of the hash lock condition.

Also disclosed is a method of initiating a transaction on a distributed ledger network, the method being carried out at a processing server and comprising:

receiving transaction data comprising a payment token that is associated with a contactless payment device, a recipient address associated with the distributed ledger network, a transaction amount, and a passcode;

generating hash data based on the transaction data; and transmitting a transaction initiation request comprising the hash data, the transaction initiation request causing generation of a smart contract on the distributed ledger network, the smart contract encoding a transaction that is locked by at least one hash lock condition that is dependent on the hash data.

Also disclosed is a terminal comprising:

memory; and at least one processor in communication with the memory;

wherein the memory stores machine-readable instructions for causing the at least one processor to:

receive a passcode associated with a locked transaction encoded in a smart contract on a distributed ledger network, the locked transaction being locked by at least one hash lock condition that is dependent on a hash;

transmit, to a contactless payment device, a request to generate a first hash;

receive, from the contactless payment device, the first hash;

generate a second hash based on the first hash and transaction-specific data associated with the locked transaction; and transmit an unlock request to a node of the distributed ledger network, the unlock request comprising the second hash and an address of the smart contract on the distributed ledger network;

wherein the unlock request causes the smart contract to release the locked transaction on matching of the second hash against the hash lock condition.

Also disclosed is a processing server comprising:

memory; and at least one processor in communication with the memory;

wherein the memory comprises machine-readable instructions for causing the at least one processor to:

receive transaction data comprising a payment token that is associated with a contactless payment device, a recipient address associated with the distributed ledger network, a transaction amount, and a passcode;

generate hash data based on the transaction data; and transmit a transaction initiation request comprising the hash data, the transaction initiation request causing generation of a smart contract on the distributed ledger network, the smart contract encoding a transaction that is locked by at least one hash lock condition that is dependent on the hash data.

BRIEF DESCRIPTION OF THE DRAWINGS

Some embodiments of methods and systems for validating transactions on a distributed ledger, in accordance with present teachings will now be described, by way of non-limiting example only, with reference to the accompanying drawings in which.

DETAILED DESCRIPTION

Embodiments of the present disclosure make use of smart contracts as an escrow mechanism to facilitate COD-type transactions on a distributed ledger, such as a blockchain. A smart contract transaction is initiated, but is not realized until the smart contract receives authentication from a payment device, such as a physical payment card or a device such as a smartphone, smart watch, or contactless fob that has payment functionality. Embodiments of the present disclosure utilise cryptographic security that is embodied in the EMVCo® (Europay, Mastercard and Visa) contactless specification to unlock the smart contract. Accordingly, the security provided by existing payment card infrastructure can be used to bolster security for distributed ledger transactions.

Figure 1:
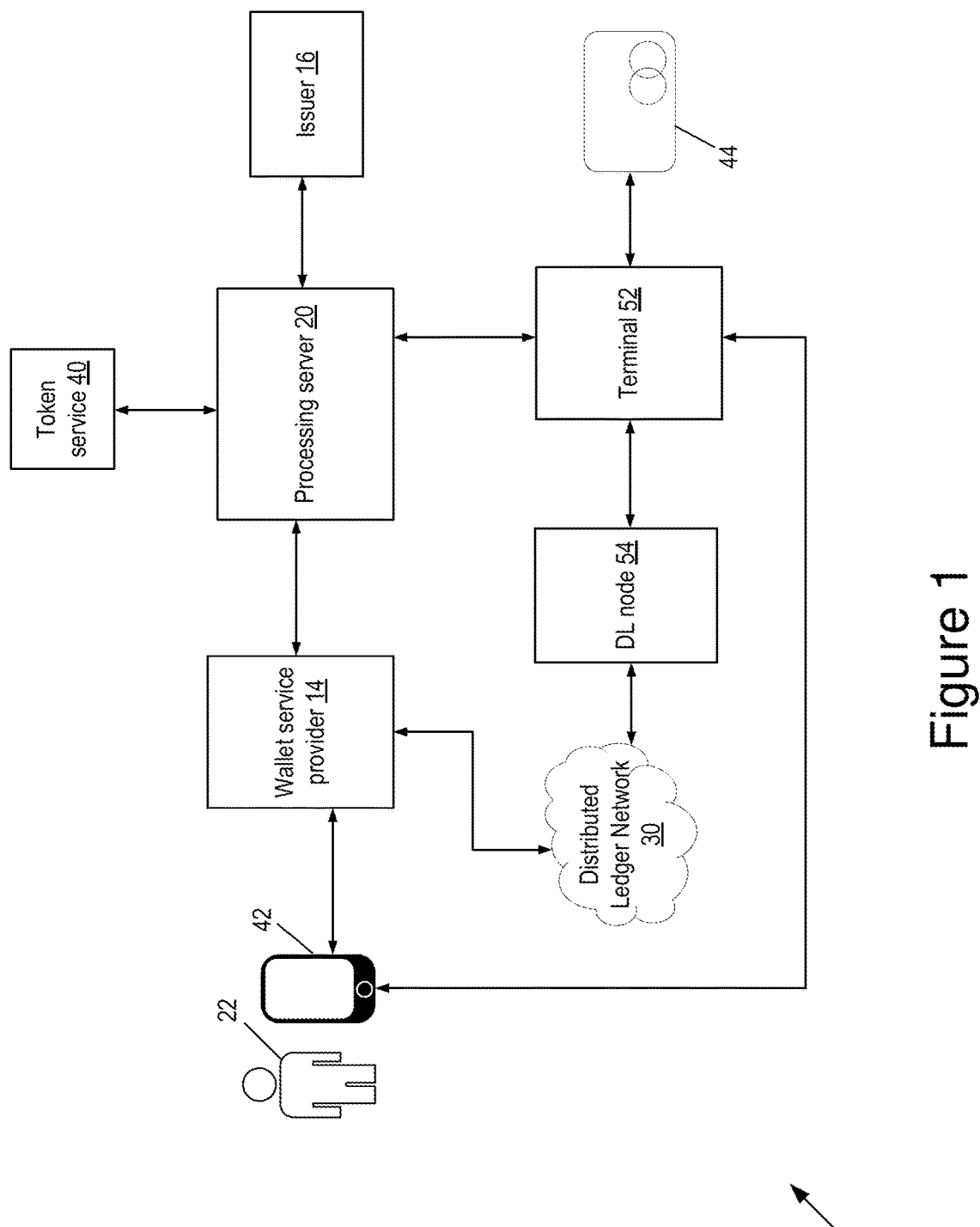
FIG. 1 is a block diagram of an example architecture of a system for validating transactions on a distributed ledger.

FIG. 1 shows an exemplary architecture of a system 10 in which embodiments may be implemented. The system 10 comprises a processing server 20 that is operable to receive requests from a wallet server 14 to bind a payment token associated with an EMV-compliant payment card of a user 22 to a key pair of the payment card. The wallet server 14 maintains digital wallet accounts for users 22, and each digital wallet account may store one or more payment tokens associated with cards of respective users 22. A user 22 may access their digital wallet account via a digital wallet application executing on a computing device 42. The digital wallet application also stores a first asymmetric key pair for the user 22. This first asymmetric key pair, which will be referred to herein as a distributed ledger key pair, is used for conducting transactions on the distributed ledger network 30.

The wallet server 14 is in communication with a distributed ledger network 30, which may be a blockchain network and will be referred to as such below (though it will be appreciated that the invention may also be implemented with other, non-blockchain, distributed ledger systems). The wallet server 14 may itself be a node of the blockchain network 30, or may be in communication with such a node, for submission of blockchain transactions.

Each digital wallet account maintained by wallet server 14 may be associated with an address on the blockchain, so that a user 22 wishing to make payment to another user may identify the recipient by their address. Each transaction will therefore typically comprise the sender's address on the blockchain, the recipient's address, and a transaction amount. The transaction amount may be an amount of cryptocurrency, such as Bitcoin, for example.

A user 22 may submit transaction requests to the blockchain network via the digital wallet application executing on computing device 42. The wallet server 14 then submits the transactions in the form of hash-locked smart contracts. That is, each transaction is encoded in a smart contract that executes on the blockchain, and is unlocked (to release payment from the sender 22 to the recipient) only when a hash received by the smart contract matches a hash associated with the locked transaction. The hash associated with the locked transaction is generated using, inter alia, a second asymmetric key pair bound to the token, so that the same payment card (or a tokenized form thereof) is required in order to unlock the transaction. The second asymmetric key pair will also be referred to herein as a card key pair.

In some embodiments, the transaction may be locked by more than one hash, so that the smart contract will require each hash to match a respective received hash in order to unlock the transaction.

In some embodiments, the locked transaction may be unlocked by user 22 interacting with a terminal 52 using the payment card 44, or other payment device 42, associated with the token. The terminal 52 generates a hash in the course of such an interaction, in a manner which will be described in more detail below. This hash is transmitted to the blockchain network 30 as part of a blockchain transaction, together with the address of the smart contract on the blockchain network 30, by the terminal 52. If the terminal 52 is itself a node of the blockchain network 30 it may do this directly. Otherwise, it may transmit the hash and the address of the smart contract to a node 54 that then transmits the transaction to the blockchain network 30. If the hash matches the hash associated with the locked transaction, this causes the smart contract to release the transaction so that the transfer of value (e.g. a transfer of Bitcoin or other cryptocurrency) from the sender 22 to the recipient can occur.

The terminal 52 may be a vending machine, kiosk, or other self-service machine that has a near-field communications (NFC) interface for reading data from and transmitting data to a contactless payment device such as computing device 42 or payment card 44. The terminal 52 may have installed thereon a contactless Level 2 EMV kernel that enables it to interact with the contactless payment device using functions defined under the EMV specification, such as cryptographic operations for card validation and other purposes. Examples of such operations include dynamic data authentication (DDA) and combined cryptogram and dynamic data authentication (CDA), which may be adapted for the present context as explained in further detail below.

In some embodiments, the terminal 52 is not a special purpose device such as a vending machine, but instead is a general purpose device such as a smartphone having an NFC interface, and also having an EMV kernel and other libraries and applications installed to enable it to perform EMV-related operations and to communicate with blockchain network 30.

Card Enrolment Process 200

Figure 2:
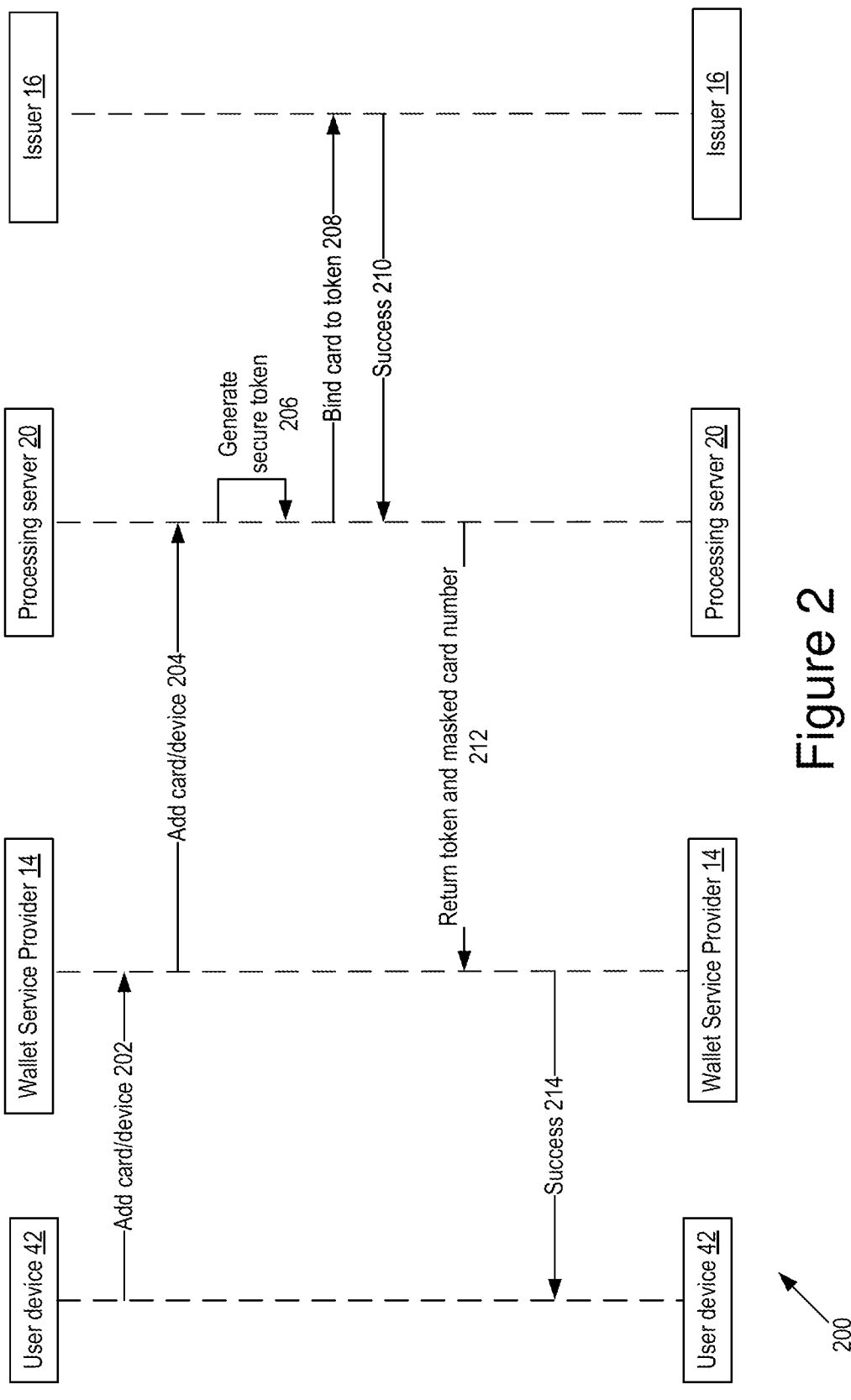
FIG. 2 is an example of a card enrolment flow in the system of FIG. 1.

FIG. 2 shows an example process flow for card enrolment in the system 10. Card enrolment 200 is initiated by a user 22 at a computing device 42 on which a digital wallet application is installed. The user 22 is in possession of a payment device, which may be a payment card having an associated primary account number (PAN), or another integrated circuit device (such as computing device 42) that stores a payment token. A payment token is typically a string of numeric characters that takes the place of, and has the same format as, a PAN in an electronic payment transaction, but which cannot be reverse engineered to reveal the actual PAN. Each PAN or payment token is linked to a backing bank account maintained by issuer 16. The term "payment number" will be understood to refer both to PANs and payment tokens, unless the context indicates otherwise.

The issuer 16 is responsible for generating (e.g., using a hardware security module), for each payment number of the user, an asymmetric key pair (card key pair) comprising an account-level private key SK and a public key PK. The private key SK is stored securely at the issuer 16, while the public key PK is stored on a payment device that is associated with the payment number, such as a payment card or a computing device 42.

The card enrolment process 200 enables binding, at the issuer 16, of a payment token for a card or other device having an associated PAN with the card key pair (SK, PK) of the card or other device.

The process 200 begins at step 202 with the user 22 initiating an "add card" flow within the digital wallet application executing on computing device 42. The digital wallet application sends an enrolment request to wallet server 14. The enrolment request comprises the PAN of the card or other device, and may comprise a wallet identifier that serves to identify the user's 22 digital wallet.

At step 204, the wallet server 14 sends an enrolment request to a processing server 20. The processing server 20 may be a server of a payment network, such as Mastercard, for example.

The processing server 20 receives the enrolment request and securely generates a token, at 206. The token may be created by the processing server 20 itself, or by a tokenization service 40 with which the processing server communicates securely. If the processing server 20 is responsible for token generation then it may maintain a token vault that contains a mapping between the generated token and the PAN received in the enrolment request. Otherwise, the tokenization service 40 maintains the token vault. The token vault may also contain other information pertaining to the token, such as a device identifier from which the tokenization request originated (and to which the token may be bound), a time of validity of the token, and any restrictions relating to use of the token (e.g., only permitted for online use, or not permitted for use with certain merchant categories).

After the token is generated, at step 208 the processing server 20 sends a binding request to issuer 16. The binding request comprises the PAN and the token. The issuer 16 retrieves the card key pair (SK, PK) associated with the PAN and stores an association between the token and the card key pair. On successful binding, a confirmation message is transmitted to the processing server 20, at 210.

At 212, the processing server 20 receives the confirmation message and returns the generated token and a masked PAN (e.g., a string that shows only the last 4 digits of the PAN) to the wallet server 14. The token and masked PAN are stored in the digital wallet account of the user 22. The masked PAN assists the user 22 to identify which card was enrolled, so that they may select the appropriate card for later transaction and validation as will later be described.

At step 214, confirmation of enrolment may be sent to the user's computing device 42 by the wallet server 14. The digital wallet application executing on computing device 42 may display the masked PAN.

Transaction Generation Process 300

Figure 3:
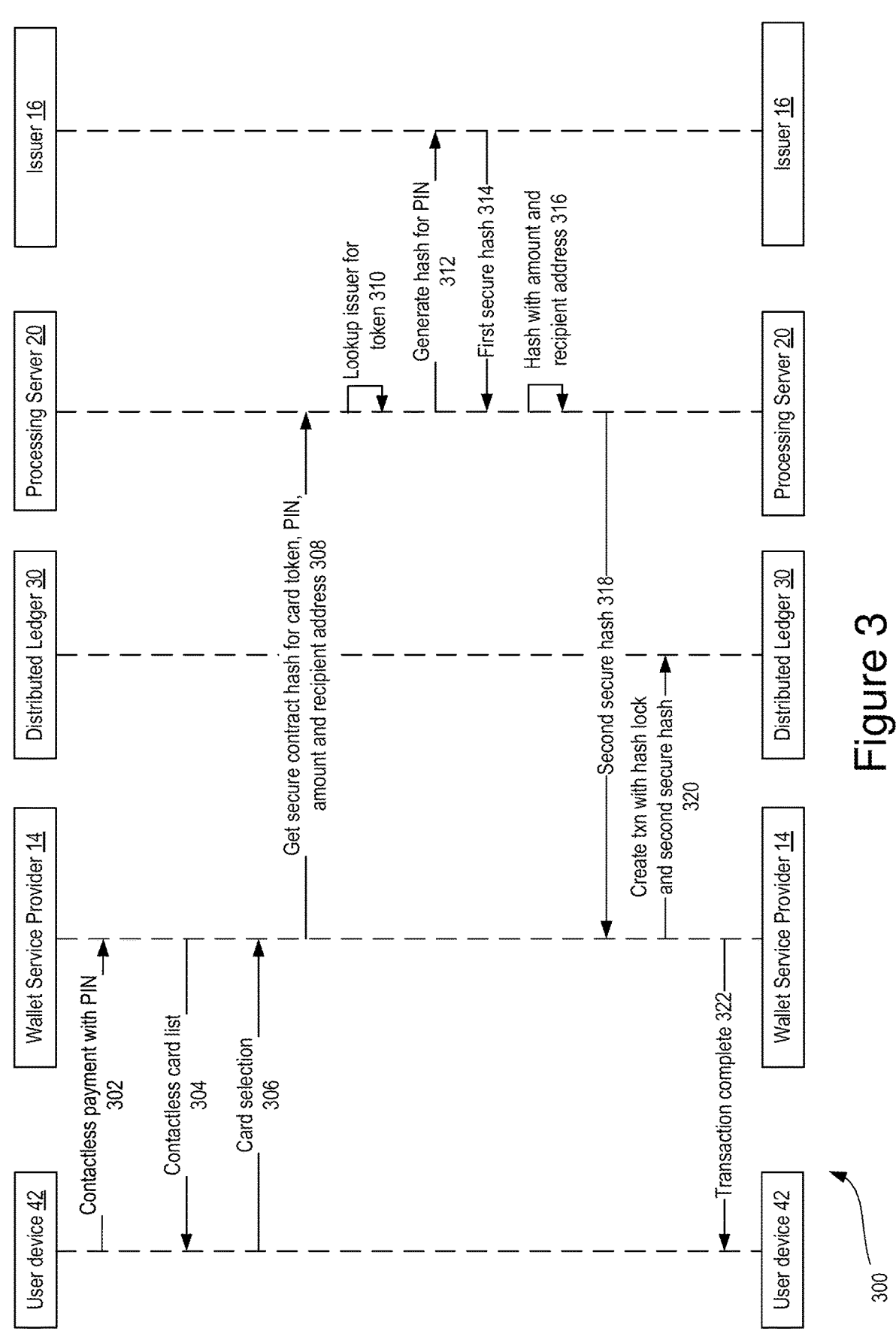
FIG. 3 is an example of a transaction flow in the system of FIG. 1.

FIG. 3 shows an example process flow for transaction generation in the system 10. The transaction generation process 300 generates a hash-locked smart contract that can subsequently be unlocked by user 22 using an enrolled payment device (e.g., enrolled according to the process 200 of FIG. 2).

At step 302, the user 22 initiates the transaction by selecting, within the wallet application executing on their device 42, a recipient, an amount to be transferred to the recipient (e.g., an amount of a cryptocurrency), and a PIN or other passcode that will be used to secure the transaction. This triggers a request to wallet server 14, which returns a list of enrolled cards to the user's device 42 at step 304. The list may comprise a list of masked PANs, and/or other indicia that the user 22 can read to identify the respective enrolled cards.

At step 306, the user 22 selects an enrolled card from the list. This is the card that will be used later to unlock the transaction. The token corresponding to the selection of the enrolled card is returned to the wallet server 14.

At step 308 the wallet server 14 sends a request to the processing server 20 to initiate a transaction. The request comprises the token, the address of the recipient on the blockchain network 30, the amount, and the passcode.

At step 310 the processing server 20 first determines, from the token received from the wallet server 14, the issuer that issued the card corresponding to the token. For example, this may be determined using a BIN lookup table or similar, using the first six digits of the token.

Once the issuer has been identified, the processing server 20 sends a request at step 312 to the identified issuer 16 to generate a first hash. The request comprises the token and the passcode. The issuer 16 may then generate the first hash by a similar hashing procedure as used in conventional EMV dynamic data authentication (DDA) or combined DDA and application cryptogram generation (CDA), except that instead of a transaction identifier, the passcode (or a number derived therefrom) is used as the "unpredictable number" that is input to the hashing algorithm. Further details of exemplary data elements used in a standard DDA/CDA process may be found in the EMV specification v 4.3, Book 3, in at least sections 5.4 and 7.2.

The hashing algorithm for generating the first hash may be SHA-1, for example, or any other hashing algorithm supported by the EMV specification. The DDA or CDA process generates signed dynamic application data, one field of which is a Hash Result that is a hash of the dynamic application data and related information. The Hash Result returned by the DDA or CDA process is used as the first hash. The hashing algorithm uses the private key SK of the card key pair to compute the hash.

At step 314, the first hash is returned to the processing server 20. A second hash is then generated by the processing server 20 by concatenating the first hash with the transaction amount and the recipient address, and applying a hashing algorithm to the result. The hashing algorithm for generating the second hash may also be SHA-1, or may be another hashing algorithm, though this will typically depend on what algorithms are supported by the digital ledger. For example, if the digital ledger is Ethereum, then the hashing algorithm for generating the second hash should be a Keccak hash of size 256 bits or greater. The key used to generate the second hash may be a public key of a certificate authority, such as Mastercard.

At step 318 the second hash is returned to the wallet server 14. The wallet server 14 may then create a hash-locked transaction on the blockchain network 30 using the second hash. The transaction may be encoded by the wallet server 14 in a smart contract, and may be locked by a hash lock condition that is dependent on the second hash. That is, to self-execute such that payment of the transaction amount from the sender to the recipient is completed, the smart contract must receive an input hash that satisfies the hash lock condition, by exactly matching the second hash. In addition to the hash lock condition, the smart contract comprises data that includes the sender's (user 22) address on blockchain 30, the recipient's address, and the amount to be transferred from sender to recipient.

In some embodiments, more than one user may be involved in the transaction. This may be the case when an organization has multiple approvals required for purchasing. If this is the case then a first user 22 may nominate a second user who also has an account with the wallet service provider 14 and who has an enrolled payment device (e.g., enrolled according to the process 200 of FIG. 2). The wallet service provider 14 may then transmit a request to a device of the second user to add a second passcode and make a selection of an enrolled payment device, such that steps 302 to 318 are repeated for the second user. This results in generation of a second hash for the second user. The smart contract may then be generated with a hash lock condition that requires matching of the second hash of either the first user or the second user; that is, either of the users may unlock the smart contract with their respective enrolled payment device. In other embodiments, for additional security, the smart contract may be generated with two hash lock conditions: a first condition that requires matching of the second hash of the first user, and a second condition that requires matching of the second hash of the second user, with both conditions needing to be met to unlock the smart contract. Either of these scenarios may, of course, be extended to more than two users.

At step 320 the wallet server 14 submits the smart contract to the blockchain network 30. Wallet server 14 may also store the blockchain address of the smart contract as a transaction identifier and this may subsequently be used by other components of the system 10 to identify the corresponding hash-locked transaction, for example the user device 42, for unlocking the transaction at terminal 52.

A copy of the blockchain address of the smart contract, or some other reference to the smart contract, may be stored in the user's wallet account at wallet server 14. This is so that the user device 42 can retrieve, and display to user 22, a list of locked transactions that are pending for the user 22. The list displayed to the user 22 may also indicate the masked PAN corresponding to the token associated with each locked transaction.

In some embodiments, the address of the smart contract may also be sent to processing server 20 for storage and subsequent retrieval. The processing server 20 may also store other information in association with the address of the smart contract, such as the token associated with the transaction locked by the smart contract, a status of the transaction (e.g., whether it is locked or not), and a timestamp of the transaction.

On successful submission of the smart contract to the blockchain network 30, the wallet server 14 sends a confirmation message to the user's device 42, at step 322.
Transaction Verification Process 400

Figure 4:
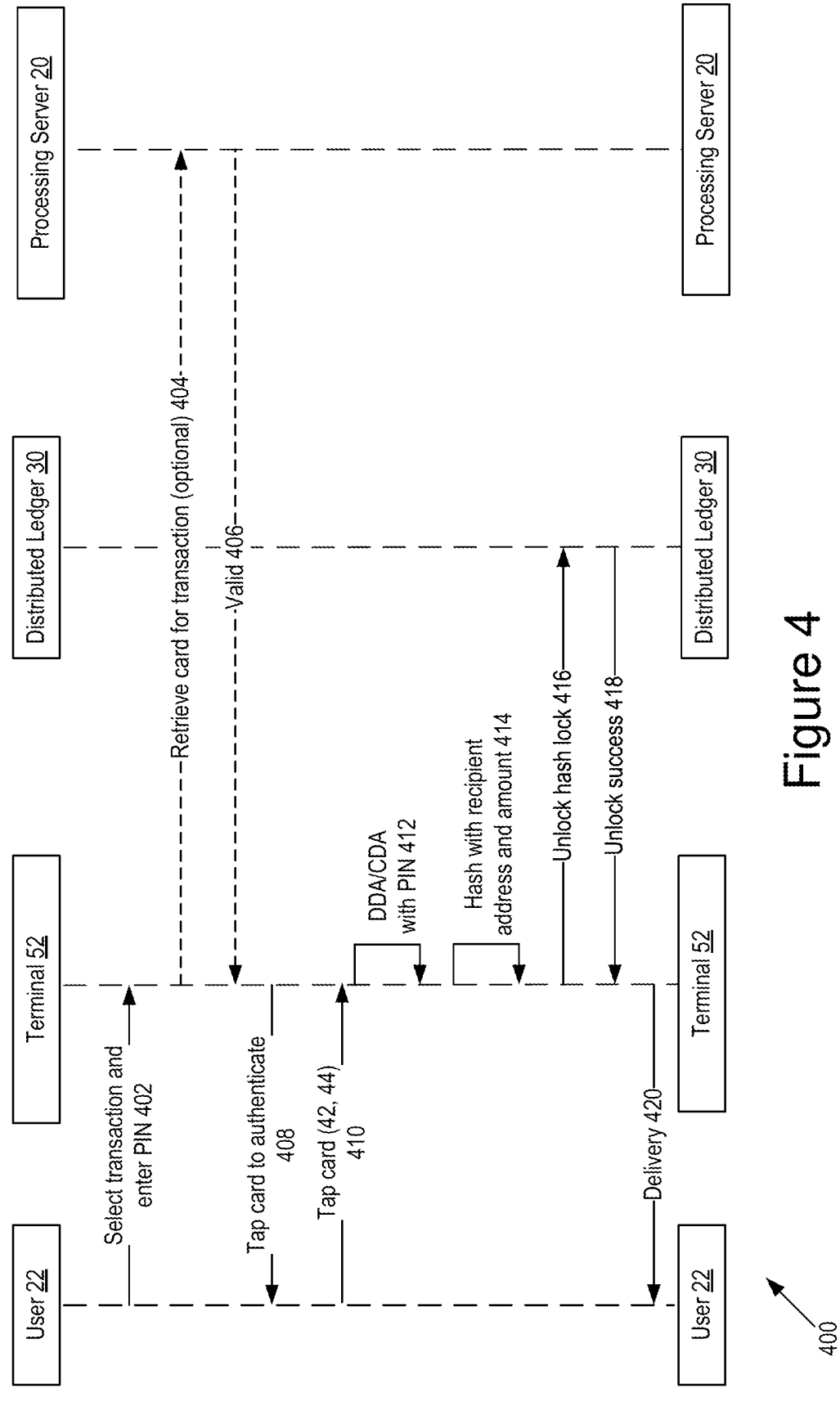
FIG. 4 is an example of a transaction validation flow in the system of FIG. 1.

FIG. 4 shows an example process flow for transaction verification in the system 10. The transaction verification process 400 enables user 22, having initiated a transaction, to unlock the transaction to release payment to the recipient.

The process 400 is carried out by a user 22 interacting with a terminal 52. The terminal 52 may be a self-service machine such as a vending machine that is configured to vend a physical product on unlocking of the transaction. Alternatively, the terminal 52 may be a smartphone or other device carried by a delivery person, who may hand over goods to the user 22 after the transaction is unlocked. The terminal 52 may have loaded thereon a list of locked transactions, each identified by an address of the corresponding smart contract on the blockchain and/or by a transaction identifier generated by the distributed ledger, and by one or more user-friendly identifiers such as the user's address, the recipient address, and the amount of the transaction.

In some embodiments, the list may be a list of transactions that is to be fulfilled during a specific time period, such as during the course of a day, and may be periodically updated in a batch synchronisation process when the terminal 52 goes online. In some embodiments, the terminal 52 may be a node of the distributed ledger system, or be in communication with a node of the distributed ledger system, such that it receives a copy of the distributed ledger that contains all transactions that have been submitted.

At step 402, the process 400 begins by the user 22 selecting a locked transaction at the terminal 52, and entering the passcode that was used when initiating the transaction (step 302 of FIG. 3).

At step 404, which is optional, the terminal 52 may send a request to processing server 20 to retrieve the card details for the locked transaction. The request may comprise the address of the smart contract, such that processing server 20 may look up the corresponding token. The processing server 20 may optionally validate the token and return the validation result to the terminal 52, at step 406. For example, the processing server 20 may check whether the token is on a blacklist of tokens that have been blocked due to the corresponding card having been stolen, or due to the card having been used in fraudulent transactions.

At step 408, the terminal 52 prompts the user 22 to tap their enrolled card associated with the transaction to unlock it.

The user 22 may then tap, at step 410, the physical card 44 having the associated PAN that was previously enrolled and mapped to a corresponding token (FIG. 2). Alternatively, the user 22 may activate the digital wallet application on user device 42 and select the appropriate token, for example by selecting a list item that can be identified by the masked PAN. This places the user device 42 in a state such that it can be read by a NFC-enabled card reader. The user device 42 can then be tapped at the terminal 52 (step 410).

At step 412, the terminal 52 obtains a first hash. This may be done by carrying out an offline data authentication process, for example a DDA process or a CDA process, with the card 44 or the user device 42. The DDA or CDA may comprise issuing an Internal Authenticate command to the user device 42 or card 44, to cause the user device 42 or card 44 to generate a cryptogram. The Internal Authenticate command uses the passcode entered by the user 22 as the unpredictable number, instead of a transaction identifier. The cryptogram that is returned by the card 44 or user device 42 to terminal 52 may comprise a first hash that is generated by a hashing algorithm (such as SHA-1) applied to dynamic application data and related information, in like fashion to the generation of the first hash by the issuer 16 at step 312 of FIG. 3. The hashing algorithm is applied using the public key PK of the card key pair of the card 44 or user device 42.

At step 414, a second hash is then generated by the terminal 52 by concatenating the first hash with the transaction amount and the recipient address, and applying a hashing algorithm to the result. The hashing algorithm for generating the second hash may also be SHA-1, or may be another hashing algorithm. The key used to generate the second hash may be a public key of a certificate authority, such as Mastercard.

At step 416 the terminal 52 sends a request to blockchain network 30 to unlock the transaction corresponding to the smart contract. The request comprises the address of the smart contract and the second hash. It may be in the form of a blockchain transaction that is transmitted by the terminal 52 itself (if the terminal 52 is a node of the blockchain network 30), or by a separate blockchain node 54 on behalf of the terminal 52.

At step 418, the transaction is validated by a consensus algorithm executed by nodes of the blockchain network 30, causing the smart contract to compare the received second hash to that of the hash lock condition of the locked transaction. If the hashes match, then the transaction is unlocked to release the payment to the recipient, and added to the distributed ledger. The result of the execution of the smart contract is returned to the terminal 52.

On receipt of the success message, at step 420, the product may be delivered to user 22. For example, if the terminal 52 is operated by a delivery person this may simply mean handing the product to user 22. If the terminal is a vending machine or other self-service device, the receipt of the success message may cause terminal 52 to actuate a vending mechanism to release the product to the user 22.

Processing Server 20

Figure 5:
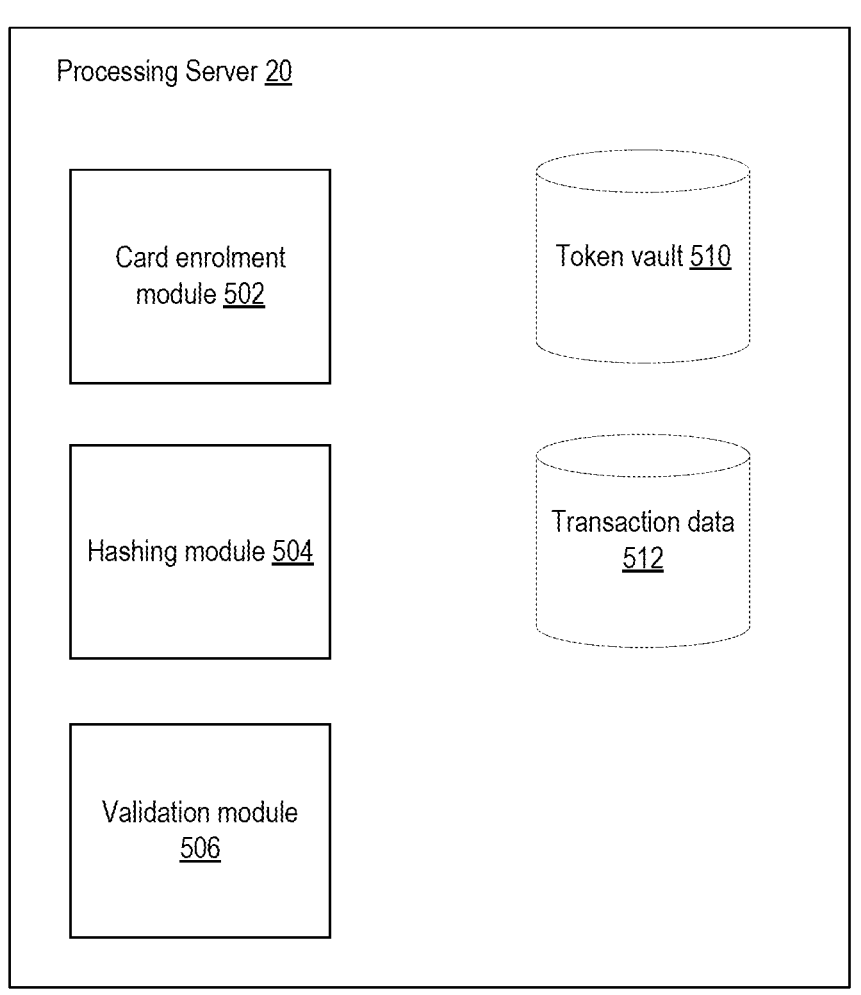
FIG. 5 is a block diagram of an example architecture of a processing server of the system of FIG. 1.
Figure 6:
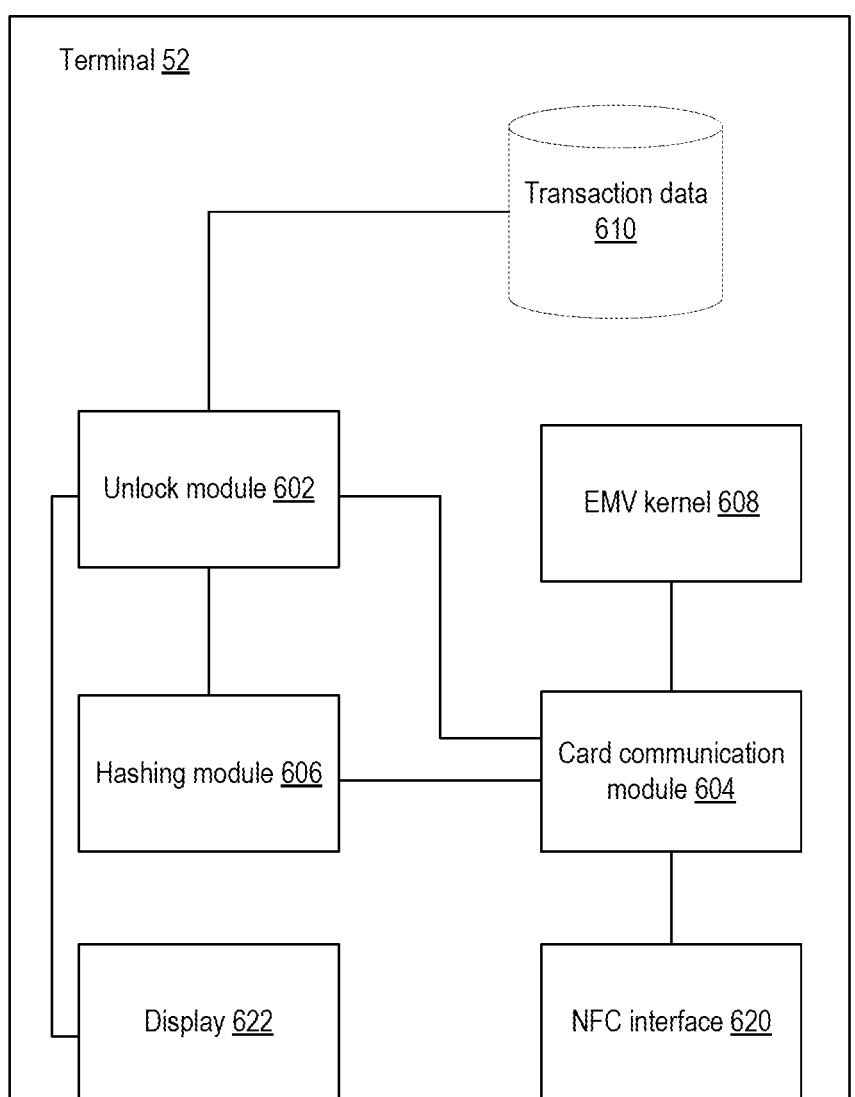
FIG. 6 is a block diagram of an example architecture of a terminal of the system of FIG. 1.

An example architecture of a processing server 20 is shown in FIG. 5.

The processing server 20 comprises a card enrolment module 502 that enables the processing server 20 to receive a card enrolment request from a wallet service provider 14, generate, or cause to be generated, a corresponding token, and request binding of the token to a card key pair (SK, PK) for the card for which enrolment is requested. The card enrolment module 502 also transmits the generated token to the wallet service provider 14 for storage in the user's wallet account. Where the processing server 20 is also responsible for tokenization, the card enrolment module 502 may also write the token to a token vault 510 of the processing server 20.

The token vault 510 stores the mapping between a token and its corresponding PAN, and may also contain other information pertaining to the token, such as a device identifier from which the tokenization request originated (and to which the token may be bound), a time of validity of the token, and any restrictions relating to use of the token (e.g., only permitted for online use, or not permitted for use with certain merchant categories).

The processing server 20 may also comprise a hashing module 504 that is configured to request an issuer 16 of the token to carry out a DDA or CDA process that results in generation of a first hash based on a passcode entered by the user 22. The hashing module 504 may comprise cryptographic functions and data that enable the processing server 20 to apply one or more hashing algorithms to data received by and/or generated by the processing server 20.

The first hash is generated as part of a transaction initiation process 300 (FIG. 3) that results in generation of a smart contract that encodes a hash-locked transaction. The passcode is used as an unpredictable number for cryptogram generation in the DDA process or CDA process, using a private key of the card key pair that is bound to the token at the issuer 16.

The hashing module 504 is also configured to generate a second hash based on the first hash received from the issuer 16, an amount of the transaction, and a recipient address on a blockchain. The hashing module 504 is further configured to send the second hash to wallet service provider 14 for generation of the smart contract to send to blockchain network 30.

The processing server 20 further comprises a validation module 506 that is configured to validate a token used in a transaction verification process 400. For example, the validation module 506 may be configured to do one or more of:

validate a consumer associated with the token, validate the card that is linked to the token, check whether the token and/or the card is on a blacklist, validate the merchant associated with the transaction for which the token is being used, and validate the transaction based on other transactions for the merchant, for example by conducting anti-money laundering or fraud detection checks. To do so, the validation module 506 may use native functionality and/or invoke external services, such as AML/fraud detection services operated by an entity such as Mastercard.

In some embodiments, the processing server 20 may comprise, or be in communication with, a transaction database 512. The transaction database 512 stores records relating to locked transactions that have been submitted to the blockchain network 30. The records may comprise data received from the wallet service provider 14 relating to the locked transactions, for example. The processing server 20 may enable transaction verification devices 20, such as terminal 52, to query the transaction database 512 to obtain a list of locked transactions for a particular sender address or recipient address on the blockchain network 30. Each record in the transaction database 512 may comprise a status of the locked transaction (e.g., whether or not it remains locked). The status of the locked transaction may be updated in transaction database 512, for example when the transaction is unlocked at step 416 of verification process 400.

Terminal 52

The terminal 52 may be a self-service machine such as a vending machine that is configured to vend a physical product on unlocking of the transaction. Alternatively, the terminal 52 may be a smartphone or other device carried by a delivery person, who may hand over goods to the user 22 after the transaction is unlocked.

The terminal 52 may store a list of locked transactions in a transaction database 610. Each transaction in the transaction database 610 may be identified by an address of a corresponding smart contract on the blockchain network 30, and by one or more user-friendly identifiers such as the user's address, the recipient address, and the amount of the transaction.

The terminal 52 comprises a NFC interface 620 that enables it to communicate wirelessly at short range with contactless payment devices such as physical cards 44 and computing devices 42. The NFC interface 620 may be controlled by a card communication module 604 that is configured to read data from, and to transmit data to, cards 44 and computing devices 42. The card communication module 604 is in communication with an EMV kernel 608 that is configured to implement functionality such as a DDA process and/or a CDA process consistent with the EMV specification.

The terminal 52 comprises an unlock module 602 that is configured to retrieve one or more locked transactions from the transaction database 610 for unlocking by a user 22. The unlock module 602 may present a list of locked transactions to user 22 via a display 622 of the terminal 52. Further, the unlock module 602 may enable user input of a passcode that was used when initiating the transaction. The unlock module 602 may then cause display 622 to prompt the user 22 to tap their enrolled card associated with the transaction to unlock it.

On tapping the enrolled card 44, or other device 42 that stores a token that is mapped to the enrolled card, the card communication module 604 cooperates with EMV kernel 608 to read data from the card 44 or device 42, via the NFC interface 620. The unlock module 602 then initiates an offline data authentication process, for example a DDA process or a CDA process, with the card 44 or the user device 42. The DDA or CDA may comprise issuing an Internal Authenticate command to the user device 42 or card 44 via the NFC interface 620, to cause the user device 42 or card 44 to generate a cryptogram. The Internal Authenticate command uses the passcode entered by the user 22 as the unpredictable number, instead of a transaction identifier.

The card communication module 604 is configured to receive the cryptogram generated by the card 44 or user device 42. The cryptogram may comprise a first hash that is generated by a hashing algorithm (such as SHA-1) applied to dynamic application data and related information, in like fashion to the generation of the first hash by the issuer 16 at step 312 of FIG. 3. The hashing algorithm is applied using the public key PK of the card key pair of the card 44 or user device 42.

The unlock module 602 is configured to receive the first hash from the card communication module 604, and to pass it to hashing module 606. The hashing module is configured to generate a second hash by concatenating the first hash with the transaction amount and the recipient address, and applying a hashing algorithm to the result. The hashing algorithm for generating the second hash may also be SHA-1, or may be another hashing algorithm. The key used to generate the second hash may be a public key of a certificate authority, such as Mastercard.

The unlock module 602 is configured to receive the second hash from the hashing module 606, and to send a request to blockchain network 30 to unlock the transaction corresponding to the smart contract. The request comprises the address of the smart contract and the second hash. For example, the unlock module 602 may be configured to form a blockchain transaction for direct transmission to the blockchain network 30. Alternatively, the unlock module 602 may be configured to send a request to a separate blockchain node 54 to generate and submit the blockchain transaction on behalf of the terminal 52.

On validation of the transaction by a consensus algorithm executed by nodes of the blockchain network 30, and subsequent unlocking of the transaction by the smart contract, the unlock module 602 is configured to receive a success message. On receipt of the success message, the unlock module 602 may display a confirmation message on display 622 and the product may be delivered to user 22. If the terminal 52 is a vending machine or other self-service device, the unlock module 602 may be configured to actuate a vending mechanism to release the product to the user 22, on receipt of the success message.

Many modifications will be apparent to those skilled in the art without departing from the scope of the present invention.

Throughout this specification, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:

1. A method of generating transactions comprising:

receiving, by a processing server, from a wallet server, transaction data including a payment token that is associated with a contactless payment device of a user, a recipient address associated with a blockchain network, a transaction amount, and a passcode;

receiving, by the processing server, from an issuer of the contactless payment device, a first hash;

generating, by the processing server, a second hash by (i) concatenating the first hash, received from the issuer of the contactless payment device, with the transaction amount and recipient address included in the transaction data received from the wallet server, and (ii) applying a hashing algorithm to the concatenation;

transmitting, by the processing server, to the wallet server, a transaction initiation request including the second hash;

in response to the wallet server receiving the transaction initiation request from the processing server, (1) generating, by the wallet server, a self-executing smart contract, and (2) encoding a transaction in the self-executing smart contract such that the transaction is hash-locked by at least one hash lock condition that is dependent on the second hash;

submitting, by the wallet server, the self-executing smart contract, to the blockchain network for storage thereof in a blockchain;

receiving, by the blockchain network, a request from a terminal to unlock the hash-locked transaction encoded in the smart contract, wherein the request includes the second hash and a blockchain address of the smart contract stored in the blockchain;

validating the hash-locked transaction, by a consensus algorithm executed by nodes of the blockchain network, such that the smart contract executes on the blockchain and compares the received second hash to the hash-lock condition of the hash-locked transaction;

determining, by the smart contract executing on the blockchain, that the received second hash matches the hash-lock condition of the hash-locked transaction; and in response to determining that the received second hash matches the hash-lock condition of the hash-locked transaction, unlocking, by the smart contract executing on the blockchain, the transaction such that payment to the recipient address is released.

2. A method according to claim 1, further comprises:

transmitting, to the issuer of the contactless payment device, a request to generate the first hash using the passcode.

3. A method according to claim 1, wherein the first hash is generated in accordance with a technical standard for smart payment cards.

4. A method according to claim 3, wherein the first hash is generated as part of a dynamic data authentication (DDA) process or a combined dynamic data authentication and application cryptogram generation (CDA) process.

5. Method according to claim 2, wherein the hashing algorithm applied to the concatenation is a SHA-1 algorithm.

6. A method according to claim 1, wherein the self-executing smart contract further encodes a time lock condition.

7. A system comprising:

a processing server;

a wallet server;

a terminal; and a blockchain network, wherein the processing server includes a memory; and at least one processor in communication with the memory;

wherein the memory comprises machine-readable instructions for causing the at least one processor to:

receive, from the wallet server, transaction data including a payment token that is associated with a contactless payment device of a user, a recipient address associated with the blockchain network, a transaction amount, and a passcode, receive, from an issuer of the contactless payment device, a first hash, generate a second hash by (i) concatenating the first hash, received from the issuer of the contactless payment device, with the transaction amount and recipient address included in the transaction data received from the wallet server, and (ii) applying a hashing algorithm to the concatenation; and transmit, to the wallet server, a transaction initiation request including the second hash, wherein the wallet server includes a wallet server memory storing wallet memory instructions that, when executed by a wallet server processor, cause the wallet server processor to perform operations including:

generating, in response to receiving the transaction initiation request from the processing server, a self-executing smart contract, and encoding a transaction in the self-executing smart contract such that the transaction is hash-locked by at least one hash lock condition that is dependent on the second hash, and submitting the self-executing smart contract, to the blockchain network for storage thereof in a block-chain, and wherein the blockchain network performs operations including:

receiving a request from the terminal to unlock the hash-locked transaction encoded in the smart contract, wherein the request includes the second hash and a blockchain address of the smart contract stored in the blockchain, validating the hash-locked transaction, by a consensus algorithm executed by nodes of the blockchain network, such that the smart contract executes on the blockchain and compares the received second hash to the hash-lock condition of the hash-locked transaction, determining, by the smart contract executing on the blockchain, that the received second hash matches the hash-lock condition of the hash-locked transaction, and in response to determining that the received second hash matches the hash-lock condition of the hash-locked transaction, unlocking, by the smart contract executing on the blockchain, the transaction such that payment to the recipient address is released.

8. A processing server according to claim 7, wherein the memory comprises instructions for generating the second hash data by:

transmitting, to the issuer of the contactless payment device, a request to generate the first hash using the passcode.

9. A processing server according to claim 7, wherein the first hash is, or is comprised in, a cryptogram that is generated in accordance with a technical standard for smart payment cards.

10. A processing server according to claim 9, wherein the cryptogram is generated as part of a dynamic data authentication (DDA) process or a combined dynamic data authentication and application cryptogram generation (CDA) process.

11. A processing server according to claim 8, wherein the hashing algorithm applied to the concatenation is a SHA-1 algorithm.

* * * * *